April 30, 1963  J. A. CARPENTER ETAL  3,087,700

CABLE SUPPORT

Filed Oct. 31, 1960

INVENTORS,
JOHN A. CARPENTER,
ARLEY D. CARPENTER;

ATTORNEY

United States Patent Office 3,087,700
Patented Apr. 30, 1963

3,087,700
CABLE SUPPORT
John A. Carpenter, 2726 E. Pontiac Way, Fresno, Calif., and Arley D. Carpenter, 7118 La Tyera Blvd., Los Angeles, Calif.
Filed Oct. 31, 1960, Ser. No. 66,124
7 Claims. (Cl. 248—74)

The present invention relates to a cable support adapted to secure one or more cables in a durable, and efficient manner. The cable support is useful in a variety of locations such as in ships, rolling stock, buildings and elsewhere. The cable support of the invention is secured to any type of structure at a desired point with means carried by the support and adapted to encircle the cable or cables to hold the same securely to the support so that shifting of the cable will not occur.

An object of the invention is the provision of a cable support which is of simple construction, easily installed by an inexperienced operator, inexpensive in cost of manufacture, and generally superior to cable supports now known to the inventors.

Figure 1:
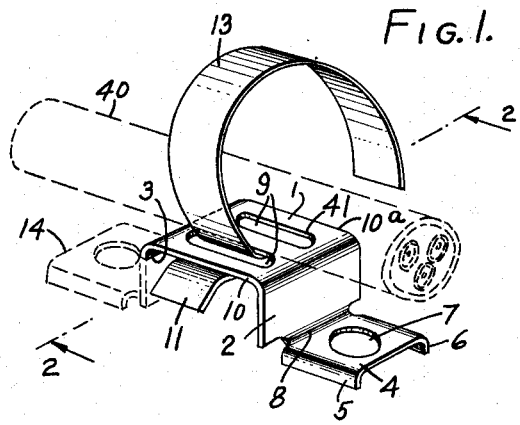
FIGURE 1 is a perspective view of one form of cable support.

Referring now to the drawing, and specifically to FIGURE 1, the cable support includes a web 1 provided with a side flange 2 in substantially right angular relationship to the plane of web 1, the side opposite that of flange 2 provided with a small dimensioned flange 3 of less depth than the flange 2. Flange 2 is provided with a lug 4 at the bottom edge of flange 2 and which lug is in right angular relationship to the plane of flange 2. The lug 4 has short depth flanged sides 5 and 6. The lug 4 is provided with a transverse bore 7. As shown in FIGURE 1, the lug is reduced in width at the zone of joinder thereof with flange 2, as shown at 8. This reduced width is accomplished by cutting the lug inwardly along each side.

The web 1 is formed with spaced apart parallel transverse slots designated generally as 9, and of which two are shown for that form of the invention shown in FIGURE 1. Secured to the under surface of the web and extending outwardly at a right angle to the edge 10 thereof, is a short length strap 11, which strap is bent downwardly relative to the plane of web 1 to provide a strap having two portions in obtuse angle relationship. This particular strap we term as "cinch" strap. Secured to the under surface of the web and between that portion of the web which lies between a pair of contiguous slots 9, is the end 12 of a strap 13. This strap we term as "clamp strap" and has a width slightly less than the length of a slot 9, may be of extended length and is preferably formed of stainless steel. The cable support of FIGURE 1 is of the cantilever type; i.e., the web is supported at one end only by the flange 2 and the lug 4. However, in certain installations it may be desirable to have greater support due to the weight of the cable, and accordingly the flange 3 may be formed so as to have the same dimensions as the flange 2 and provided with a lug, as shown by the dotted lines at 14.

Figure 6:
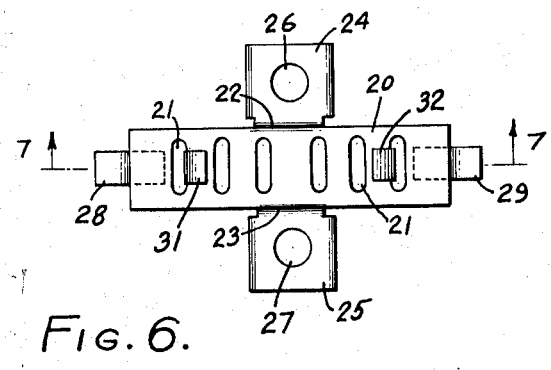
FIGURE 6 is a plan view of a modified type of cable support from that of FIGURE 1; and, FIGURE 7 is a sectional view on the line 7—7 of FIGURE 6, and showing cables supported by the cable support.
Figure 5:
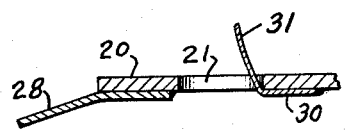
FIGURE 5 is a fragmentary, partially sectional detail of the cable support and clamp strap.

In FIGURE 6 we have modified the invention from that of FIGURE 1 in that the web 20 is of extended length and provided with a plurality of transverse slots 21 in spaced relationship. Intermediate the length of the web, flanged portions are provided at 22 and 23 which are in right angular relationship to the web and terminate in outstanding lugs 24 and 25, each lug provided with a transverse bore at 26 and 27. The web 20 has secured at each end and beneath the same, cinch straps 28 and 29, which straps are bent in the same manner as shown for the cinch strap 11. The stainless steel clamp straps, of which there are two in the present instance, have end portions passed through the outermost slots 21 and secured beneath the web, as shown in FIGURE 5 at 30. As stated, two straps are provided and here designated as 31 and 32.

Figure 2:
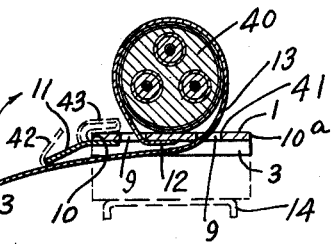
FIGURE 2 is a sectional view on the line 2—2 of FIGURE 1, the clamp strap of the invention embracing a cable.

The operation, uses and advantages of the invention just described, are as follows:

In that form of the invention shown in FIGURES 1 and 2, a cable 40 is positioned on the web 1, the axis of the cable paralleling the long length of the slots 9, and in the present instance the cable is intermediate the two slots shown. A length of strap 13 is passed around the cable with the strap passed through slot 9 at 41. By means of a pair of pliers or similar article, the strap is tensioned about the cable and extended beneath the web and then bent upwardly against the outer end of the cinch strap 11. Cinch strap 11 is characterized in that it is stiffer and resists bending more than does the clamp strap 13. Thus the operator, upon tensioning strap 13 about the cable, uses the end of the cinch strap 11 as a fulcrum point and bends the strap 13 upwardly, as shown by the dotted lines, at 42. At this time the clamp strap may be cut to the length desired, which, roughly, would be the end of the dotted line position at 42. This operation takes care of an initial tensioning of strap 13 around the cable and the clamp strap is further tensioned about the cable when the operator opens the jaws of the pliers so as to embrace end 42 and that portion of strap 13 lying beneath the cinch strap. The jaws are closed so as to pinch the parts together so that the sides of the clamp strap on opposite sides of the cinch strap are parallel, followed by bending the combined cinch strap and the clamp strap upwardly around the edge 10 of the web 1, then downwardly to the dotted line position at 43. This latter operation is accomplished by placing the plier jaws between the web and the clamp strap. This bending covers a degree slightly greater than 180, and is sufficient to hold the clamp strap tensioned about the cable without fear of any slippage between the clamp strap and the cable. The final position of the clamp strap and cinch strap, is that shown in section in FIGURE 3.

Figure 3:
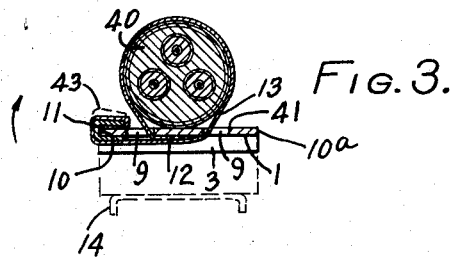
FIGURE 3 is a view similar to that of FIGURE 2, the clamp strap being tightened about the cable.
Figure 4:
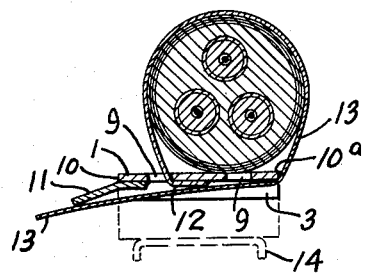
FIGURE 4 is a transverse sectional view similar to that of FIGURE 2, the clamp strap being passed around an edge of the cable support.

As shown in FIGURE 4, a larger diameter cable than that shown in FIGURES 2 and 3 may be accommodated on the mounting space of web 1 by passing the clamp strap around the cable and the edge 10a of the web.

Figure 7:
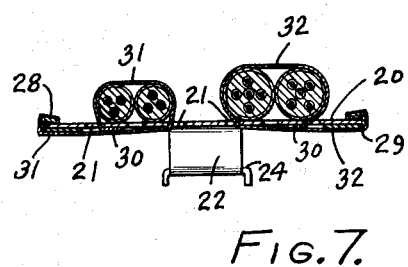

In FIGURE 6, the web is of a length sufficient to accommodate several cables of different sizes, and while it is possible to secure several cables of varying diameters by a single clamp strap, in FIGURE 7 we have shown two pairs of cables, each pair having a different diameter. In place of passing the clamp strap around a single cable, in FIGURE 7 the straps are passed around pairs of cables and secured in the same manner as has been described for FIGURE 1.

It is also within the purview of the invention to secure cables having different diameters with cables closely nested together and held by a single clamp strap. Obviously, the operator installing the cables will estimate the number and size of clamps necessary to properly support the cables whereupon the cable supports will be attached to a suitable foundation member such as a wall, by passing screws through the openings 7 in the lugs. The installer or operator will estimate the length of the clamp strap necessary, and will select the cable suports in accordance with said length for the reason that one end of the clamp strap has been welded or otherwise secured to the under surface of the web.

It is evident that a single operator may install the cable supports and quickly secure the cables to said supports as work proceeds. The support of the invention may employ double wraps of clamp straps, if desired, as the surplus strap may be utilized for future additions on a web of extended length such as shown in FIGURE 6. The use of narrow width flanges 5 and 6 for the lugs is an advantage in that it spaces the cable support from the object to which it is attached, either by screws or bolts, and permits air circulation beneath the lugs to help prevent rust from forming. It is prefererd that the cinch straps should be formed of a stainless steel which has been fully annealed, and that the clamp straps should be cadmium plated. It is obvious that the cable supports may be used more than once simply by reversing the operation of securing the end of the clamp strap to the cinch strap.

We claim:

1. A cable support comprising: a web provided with spaced apart transverse slots, a flange in right angular relationship to the plane of the web extending along one edge thereof, a lug secured to the flange in right angular relationship thereto, a clamp strap having one end portion passed through one of the slots of the web and secured to the web, the web adapted to support a cable, around which the strap is passed and through an adjacent slot; a cinch strap projecting from one edge of the web and having a free edge forming a fulcrum, the clamp strap adapted to be tensioned about the cable supported on the web and bent around the end of the cinch strap to tension the clamp strap when the cinch strap and clamp strap are revolved as a unit so as to overlie a portion of the web.

2. A cable support, including: a web adapted to be mounted on a structure, said web provided with a slot, a clamp strap having one end portion secured to the web and passed through said slot, the web adapted to support a cable around which the clamp strap is passed and extend beneath the web, a cinch strap secured to the web and having a free end projecting from the web adjacent the slot said free end forming a fulcrum, the clamp strap adapted to be bent at an obtuse angle around the free end of the cinch strap to tension the clamp strap when the cinch strap and clamp strap are bent at an obtuse angle so as to overlie a portion of the web.

3. A cable support, including: a web providing a mounting space for a cable, the web adapted to be spacedly secured to a structure; a flexible clamp strap one end of which is fixedly secured to the web, a cinch strap fixedly secured at one end to the web and projecting outwardly from said web to provide a free end for use as a fulcrum, said clamp strap adapted to surround the cable to hold the same on the web when the clamp strap is passed beneath the web and bent into U-shape around the free end of the cinch strap to tension the clamp strap, and the portions of the clamp strap and of the enclosed cinch strap are rotated together through an angle of more than 180° to rest upon the web, said cinch strap being stiffer than and resisting bending more than the clamp strap.

4. A cable support including a flat web having therethrough a plurality of parallel transverse slots, a side flange at right angles to the web and having a lug at right angles adapted to secure the cable support to a hanger, parallel short depth flanges on the lug to space the lug from the hanger to provide air circulation between the lug and hanger, a flexible clamp strap welded at one end to the web and projecting upward through a proximate parallel slot and around a cable resting upon the web and then passed down through another slot, a cinch strap secured to the web adjacent the first mentioned slot and extending outwardly and downwardly from the proximate side of the web with its outer edge forming a fulcrum about which the clamp strap is bent, said cinch strap with the clamp strap thus folded thereon then being bent together around the side of the web through an angle in excess of 180° thus holding the clamp strap tensioned about the cable and preventing slippage.

5. The cable support of claim 4 in which the cinch strap is stiffer and resists bending more than does the clamp strap.

6. The cable support of claim 5 in which the clamp strap is of stainless steel and of a width slightly less than the length of one of the parallel slots, the web side flange and the lug form the sole support on the hanger of the cable support and the cable carried thereby, and a portion of the clamp strap rests upon the upper surface of the web after the 180° bend.

7. A cable support having a flat web of relatively heavy metal adapted to support a cable, a side flange integral with the web, a lug integral with the side flange, extending parallel to the flat web and having a hole therethrough for reception of means for securing the cable support to a hanger; a clamp strap secured to the flat web and adapted to surround the cable to bind the cable to the flat web, a cinch strap secured to the flat web to extend parallel to the clamp strap and having a transverse fulcrum edge, one surface of the clamp strap engaging the fulcrum edge along its width, the clamp strap being bent in U-shape over said fulcrum edge and the clamp strap and the enclosed cinch strap bent together as a unit through an obtuse angle thus tensioning the cable on the flat web, whereby to avoid shifting of the cable.

References Cited in the file of this patent
UNITED STATES PATENTS

| | | |
|---|---|---|
| 1,085,421 | Hiller | Jan. 27, 1914 |
| 2,390,232 | Venditty | Dec. 4, 1945 |
| 2,560,845 | Carpenter | July 17, 1951 |
| 2,654,926 | Delafosse | Oct. 13, 1953 |
| 2,939,664 | Wesseler | June 7, 1960 |